United States Patent
Brask et al.

(10) Patent No.: US 7,262,140 B2
(45) Date of Patent: Aug. 28, 2007

(54) METHOD OF SMOOTHING WAVEGUIDE STRUCTURES

(75) Inventors: Justin K. Brask, Portland, OR (US); Bruce A. Block, Portland, OR (US)

(73) Assignee: Intel Corporation, Santa Clara, CA (US)

(*) Notice: Subject to any disclaimer, the term of this patent is extended or adjusted under 35 U.S.C. 154(b) by 134 days.

(21) Appl. No.: 10/721,448

(22) Filed: Nov. 24, 2003

(65) Prior Publication Data
US 2005/0111806 A1    May 26, 2005

(51) Int. Cl.
*H01L 21/302* (2006.01)

(52) U.S. Cl. .................. 438/725; 385/14; 385/36; 385/129; 385/130; 385/131; 385/132; 318/254; 216/24; 65/386

(58) Field of Classification Search ............. 438/725
See application file for complete search history.

(56) References Cited

U.S. PATENT DOCUMENTS

| | | | | |
|---|---|---|---|---|
| 3,999,835 A | * | 12/1976 | Newns et al. ............. 385/142 |
| 4,695,122 A | * | 9/1987 | Ishida et al. ............. 385/130 |
| 4,817,652 A | * | 4/1989 | Liu et al. ............. 134/102.1 |
| 5,466,389 A | * | 11/1995 | Ilardi et al. ............. 510/175 |
| 5,841,931 A | * | 11/1998 | Foresi et al. ............. 385/131 |
| 5,976,767 A | * | 11/1999 | Li ............. 430/313 |
| 6,224,713 B1 | * | 5/2001 | Hembree et al. ...... 156/345.11 |
| 6,703,319 B1 | * | 3/2004 | Yates et al. ............. 438/745 |
| 6,850,683 B2 | * | 2/2005 | Lee et al. ............. 385/129 |
| 6,890,450 B2 | * | 5/2005 | Naydenkov et al. ...... 216/24 |
| 2004/0240822 A1 | * | 12/2004 | Patel et al. ............. 385/130 |

OTHER PUBLICATIONS

Wolf et al., Silicon Processing for the VLSI Era, 1986, Lattice Press, vol. 1, pp. 519, 529-30, 534, 551.*
Awad (Ultrasonic Cavities and Precission Cleaning (Nov. 1996); Precision Cleaning—The Magazine of Critical Cleaning Technology; Witter Publishing Corporation.*
Wolf et al. (Silicon Processing for the VLSI Era, vol. 1, Lattice Press (1986)).*
Bierhoff (Influence of the Cross Sectional Shape of Board-integated Optical Waveguides on the Propagation Characteristics; Univ. of Paderdorn, Germany; presented at 6th IEEE-SPI Workshop; May 13, 2002).*

* cited by examiner

*Primary Examiner*—Nadine G. Norton
*Assistant Examiner*—Patricia A. George
(74) *Attorney, Agent, or Firm*—Blakely, Sokoloff, Taylor & Zafman LLP

(57) ABSTRACT

A semiconductor based structure containing substantially smoothed waveguides having a rounded surface is disclosed, as well as methods of fabricating such a structure. The substantially smoothed waveguides may be formed of waveguide materials such as amorphous silicon or stoichiometric silicon nitride. The substantially smoothed waveguides are formed with an isotropic wet etch combined with sonic energy.

20 Claims, 8 Drawing Sheets

METHOD OF SMOOTHING WAVEGUIDE STRUCTURES

BACKGROUND OF THE INVENTION

1. Field of the Invention

The present invention relates to the field of semiconductor processing, and more particularly to the fabrication of waveguides for use integrated circuits containing semiconductor devices.

2. Discussion of Related Art

Transferring data by electricity within an integrated circuit has limitations in speed due to the heat produced. Also, the speed of transferring data by electricity is limited by the data rate. Therefore, the use of light to transfer data within an integrated circuit may be advantageous because light does not cause heat problems like electricity and light is also not limited by the data rate. In order to transfer data by light within an integrated circuit, waveguides take the place of the metal wires used to transmit electricity. Waveguides may be formed with any material that will transmit light from one point to another. The waveguides within an integrated circuit are surrounded by a cladding material to trap the light within the waveguides so that the signal is not lost after entering the waveguide.

One method of forming waveguides is illustrated in FIGS. 1a-1e. In FIG. 1a, a substrate is provided on which the waveguides and the integrated circuit may be formed. On this substrate 110, a first layer of dielectric material 120 is deposited. This layer of dielectric material 120 will serve as part of the cladding of the waveguides. Above the layer of dielectric material 120, a layer of waveguide material 130 is deposited at FIG. 1c. The waveguide material 130 can be any type of material that will transmit light with minimum light loss through the waveguide. The waveguide material 130 may have a rough top surface 135 after it is deposited. At FIG. 1d, the waveguide material 130 may be etched with an anisotropic dry plasma etch to form waveguides 140. The waveguides 140 may have sidewall roughness 145 after the anisotropic dry plasma etch. Over the waveguides 140, as illustrated in FIG. 1e, a second layer of dielectric material 150 is deposited to complete the cladding surrounding the waveguides 140.

The waveguides 140 formed by the above method do not transmit light very well. This is because the intensity of the incident light 160 that enters the waveguides 140 will be reduced by the sidewall roughness 145 and rough top surfaces 135 of the waveguides 140. The end light 170 that exits the waveguides 140 is much diminished in intensity. Therefore, the signal carried by this light will be noisy and the signal will be weakened due to a discrepancy between the initial light intensity and the final light intensity.

DETAILED DESCRIPTION OF THE PRESENT INVENTION

Described herein are methods of smoothing a waveguide to improve the propagation of light within the waveguide. Also, methods of forming such a waveguide are disclosed. In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative and not restrictive of the current invention, and that this invention is not restricted to the specific constructions and arrangements shown and described because modifications may occur to those ordinarily skilled in the art. In other instances, well known semiconductor fabrication processes, techniques, materials, equipment, etc., have not been set forth in particular detail in order to not unnecessarily obscure embodiments of the present invention.

Figure 1A:
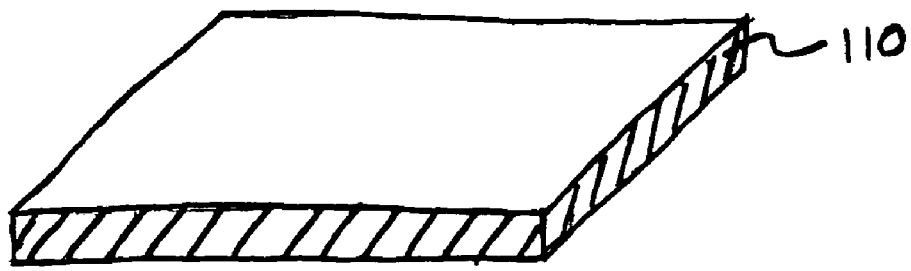
FIGS. 1a-1e are illustrations of a cross-sectional view of the fabrication of waveguides formed above a semiconductor substrate using a prior art method.
Figure 1B:
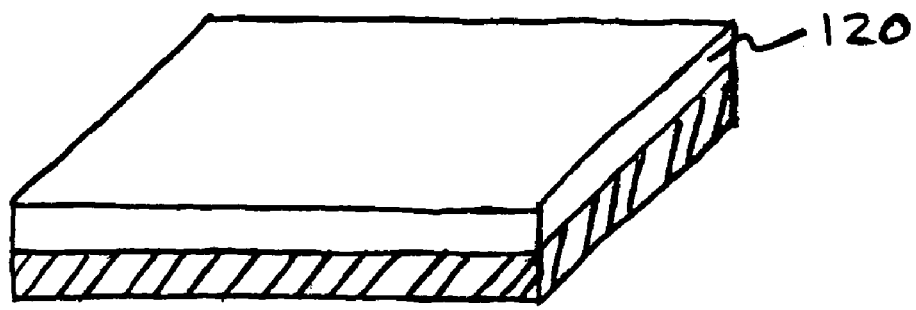
Figure 1C:
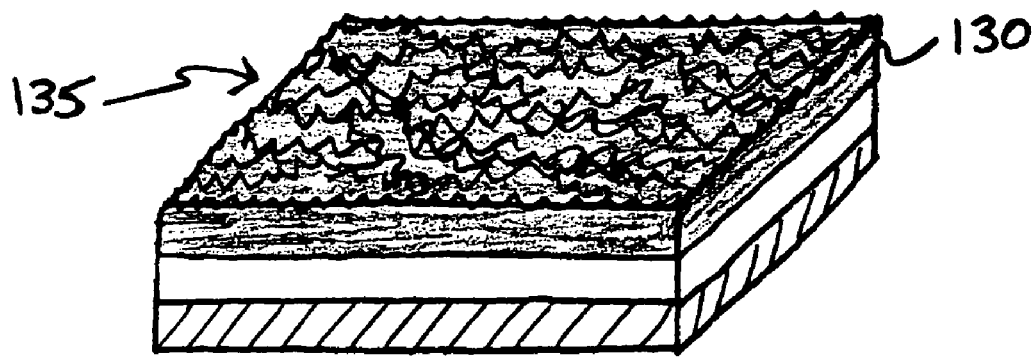
Figure 1D:
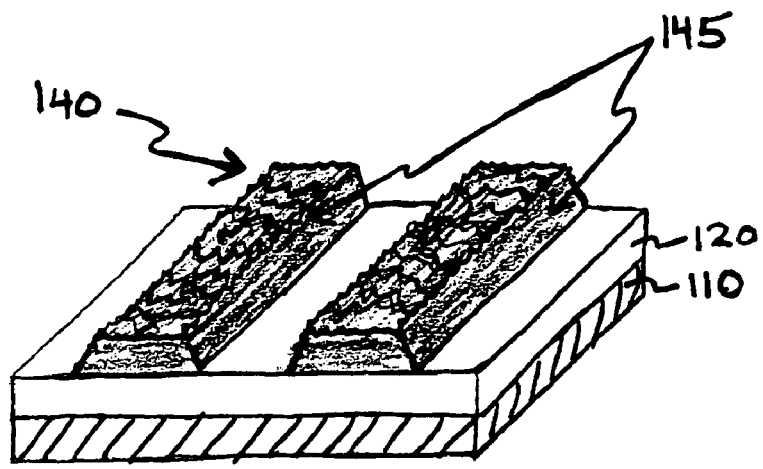
Figure 1E:
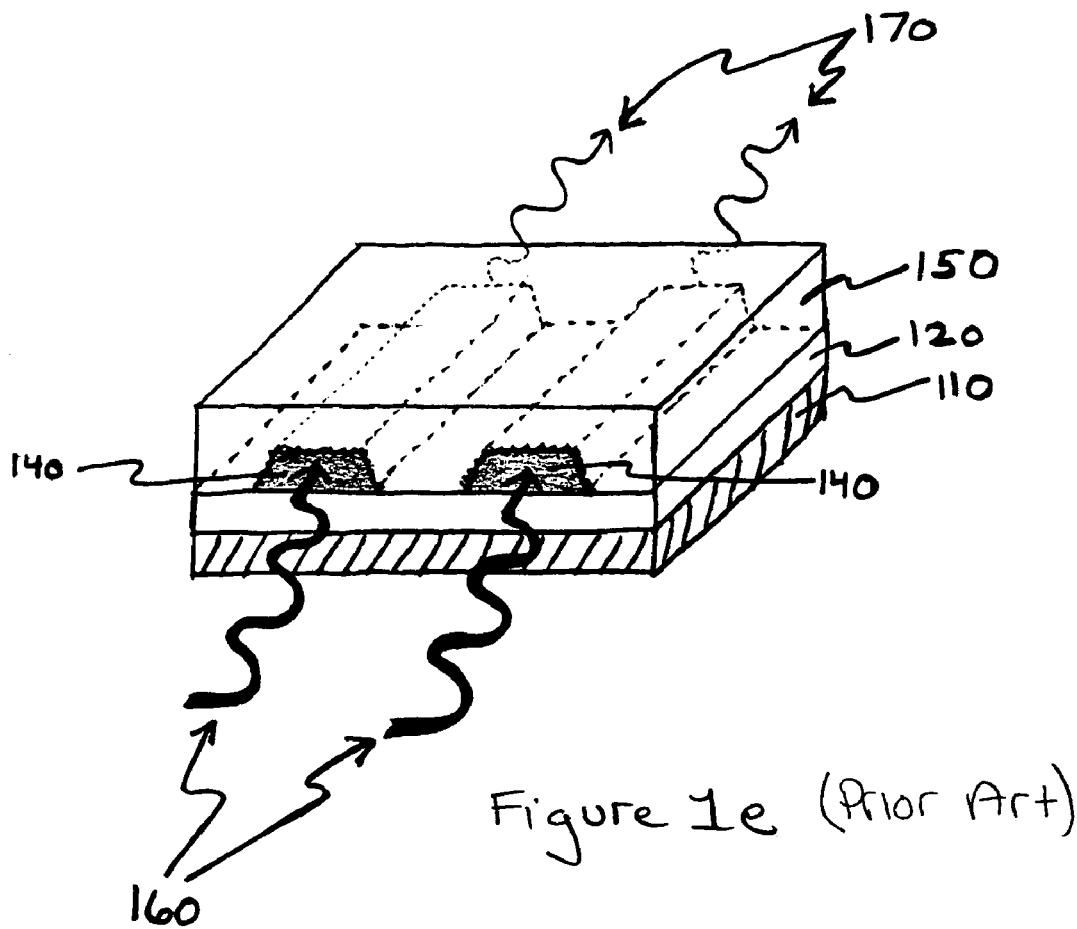
Figure 2:
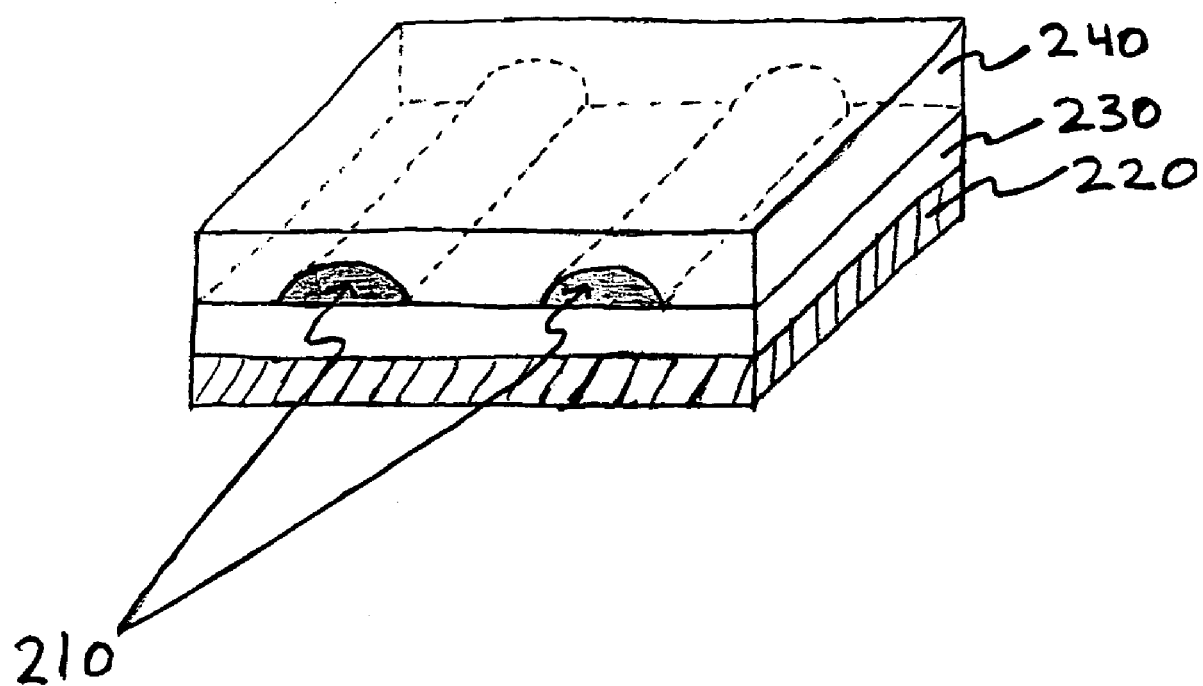
FIG. 2 is an illustration of a cross-sectional view of a structure containing substantially smoothed waveguides above a semiconductor substrate.

A waveguide having a substantially rounded surface and formed on a semiconductor substrate is described herein. A waveguide having a substantially rounded surface has been demonstrated to reduce the scattering of the light signal within the waveguide to minimize light loss during propagation of the light through the waveguide. The retention of the intensity of the light signal can therefore be maximized. The waveguides 210, as illustrated in FIG. 2, are on a semiconductor substrate 220. As illustrated, the waveguides 210 may have a substantially smooth and convex rounded surface and may have a width in the approximate range of 0.1 um and 10 um, and a height in the approximate range of 0.1 um and 10 um. In an alternate embodiment, the structure need not be exactly one hemisphere in the cross section, but instead may be a near ideal squared off trapezoidal structure with ultra-smooth walls, top surface, and smooth curved edges. The waveguides may be formed of any material that can transmit signals of a wavelength compatible with the scale of the device in which the waveguides 210 may be used. Examples of wavelengths that may be used in the waveguides 210 include near infrared wavelengths of between 800 nm and 1600 nm, and visible light wavelengths between 500 nm and 700 nm. The use of a lower frequency light signal is also more energy efficient. But, the use of a lower frequency light signal necessitates an even lower noise level. An example of a material of which the waveguides 210 may be formed is stoichiometric silicon nitride ($Si_3N_4$) that may transmit signals having the wavelengths of 850 nm, 1310 nm, and 1550 nm. Amorphous silicon (a-Si) is another example of a material of which the waveguides 210 may be formed. Amorphous silicon may transmit signals that have the wavelengths of 1310 nm and 1550 nm. Amorphous silicon causes less light scattering than other types of silicon, such as polysilicon, because it has no grain boundaries or facets.

The semiconductor substrate 220 may be a material well known in the art such as device quality silicon (Si), germanium (Ge), silicon on insulator (SOI), silicon on sapphire (SOS), or gallium arsenide (GaAs). The semiconductor substrate 220 may be in the form of a wafer. A first dielectric layer 230 is in between the semiconductor substrate 220 and the waveguides 210. A second dielectric layer 240 is formed above the waveguide and the first dielectric layer. The first dielectric layer 230 and the second dielectric layer 240 serve as cladding around the waveguides 210. The first dielectric layer 230 and the second dielectric layer 240 may be any type of dielectric material having an index of refraction lower than the material used to form the waveguides 210. For example, amorphous silicon has an index of refraction in the approximate range of 3.5 to 3.7 and stoichiometric silicon nitride has an index of refraction of approximately 2.0. Examples of dielectric materials that may be used include carbon doped oxide, silicon dioxide, SiOF, polymers, and silicon oxynitride. The first dielectric layer 230 and the second dielectric layer 240 may be the same material, or different materials. If the first dielectric 230 and the second dielectric 240 are different materials, they may be materials having the same or similar indices of refraction. Alternatively, if the first dielectric 230 and the second dielectric 240 are different materials they may be materials having different indices of refraction, as long as the indices of refraction of the first dielectric 230 and the second dielectric 240 are lower than the index of refraction of the waveguides 210.

Figure 3A:
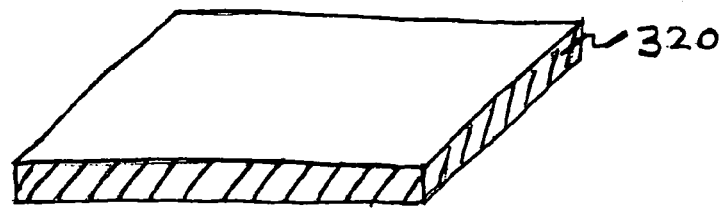
FIGS. 3a-3i are illustrations of a cross-sectional view of the fabrication of smoothed waveguides having a rounded surface.
Figure 3B:
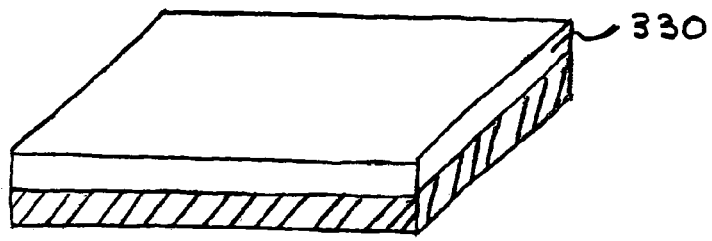
Figure 3C:
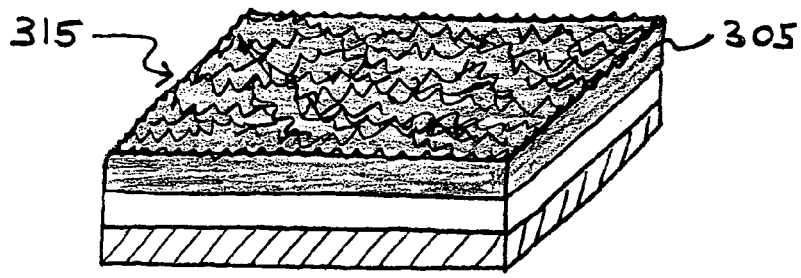
Figure 3D:
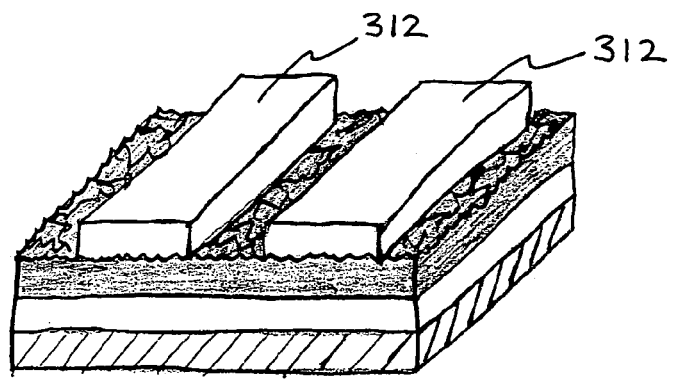
Figure 3E:
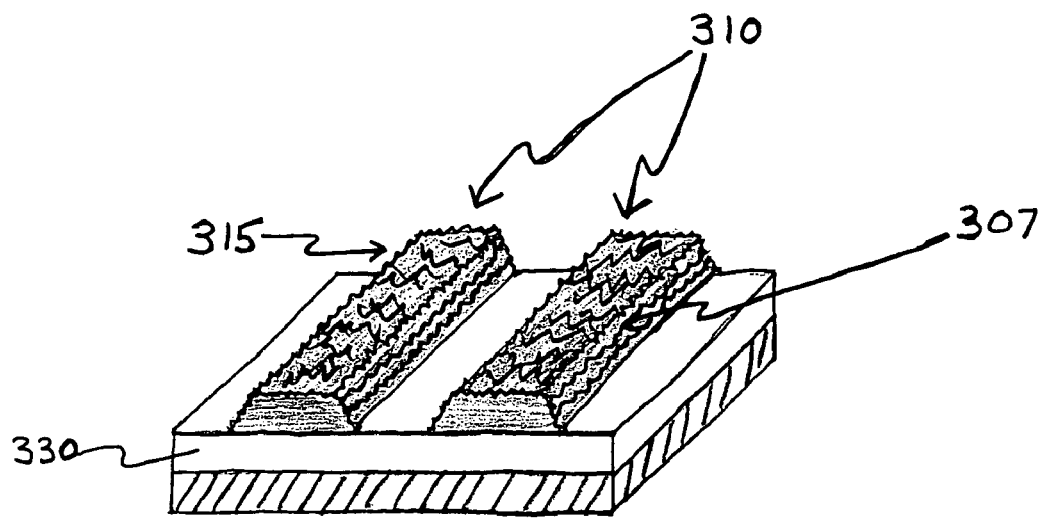

A waveguide structure, such as the one described above and in FIG. 2, is formed by providing a semiconductor substrate 320 as illustrated in FIG. 3a. The semiconductor substrate 320 may be a material well known in the art such as device quality silicon (Si), germanium (Ge), silicon on insulator (SOI), silicon on sapphire (SOS), or gallium arsenide (GaAs). The semiconductor substrate 320 may be in the form of a wafer. A first dielectric layer 330 is then formed above the semiconductor substrate 320 as illustrated in FIG. 3b. Above the first dielectric layer 330, a layer of waveguide material 305 is deposited as illustrated in FIG. 3c. The waveguide material 305 may be deposited by chemical vapor deposition or physical vapor deposition. The waveguide material 305 may be any material that can transmit signals of a wavelength compatible with the scale of the device in which the waveguides 310 may be intended for use. Examples of such materials include amorphous silicon (a-Si) and stoichiometric silicon nitride ($Si_3N_4$). The waveguide material 305 may have a top surface roughness having a root mean square (RMS) roughness of approximately 2 RMS, or in other words a peak to trough depth of approximately 2 nanometers. The top surface roughness 315 that may contribute to the scattering of light within the waveguides formed from the waveguide material 305. In one embodiment, a photoresist mask 312 is formed over the waveguide material 305 by developing a photoresist to pattern the waveguides 310, as illustrated in FIG. 3d. The waveguide material may then be anisotropically etched into the general form of the final waveguide structures having a trapezoidal anisotropic shape, as illustrated in FIG. 3e. The waveguides 310 may be formed by an anisotropic dry plasma etch. The dimensions of the waveguides formed by the anisotropic dry plasma etch may be up to 20% larger, and in one embodiment approximately 5% larger, than the ultimate dimensions of the waveguides 310 after the wet etch described later, because the subsequent isotropic wet etch may shrink the dimensions of the waveguides 310. The amount by which the waveguides 310 may shrink during the isotropic etch depends on the etch rate of the waveguide material 305. Any impurities on the surfaces of the waveguides 310 may be removed during the anisotropic dry plasma etch. After the dry plasma etch, the top surface roughness 315 of the waveguide material is retained and there is sidewall roughness 307 having a peak to trough depth of around several nanometers (usually greater than 2 nm) due to the dry plasma etch. If a light signal were sent through waveguides 310 at this point there would be a great deal of scattering of the light signal out of the waveguides 310 due to the top surface roughness 315 and the sidewall roughness 307. In an embodiment employing an anisotropically etched silicon nitride waveguide, the light intensity lost within the waveguide is approximately 8 dB/cm (decibels per centimeter).

Figure 3F:
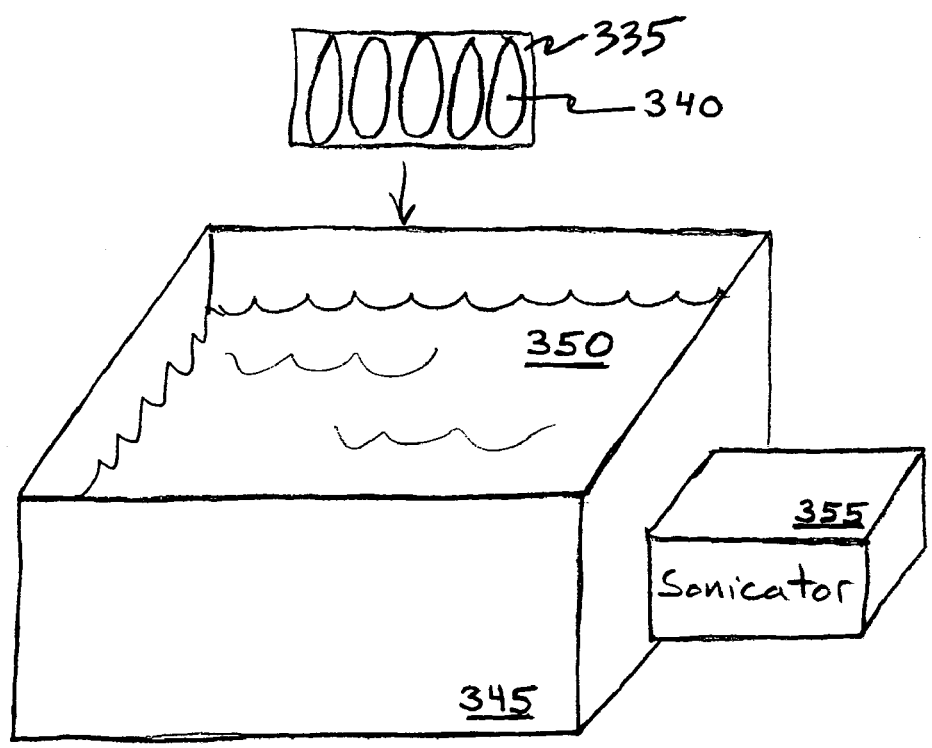
Figure 3G:
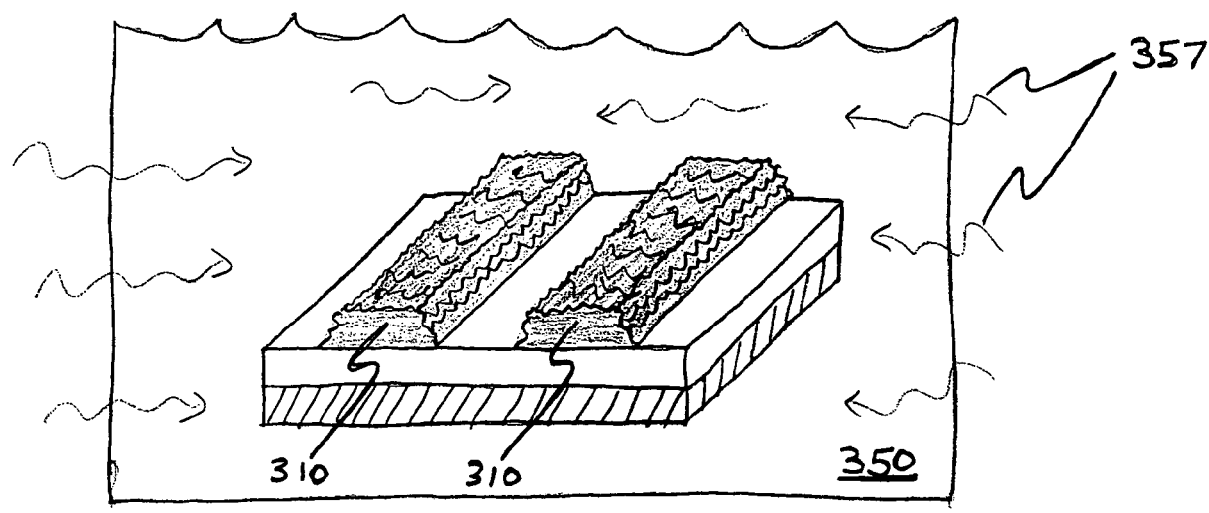

To substantially smooth the top surface roughness 315 and the sidewall roughness 307 of the waveguides 310, the waveguides 310 may be etched with an isotropic etch. An isotropic etch is used because it may etch down the sharp points and even out the surface of the waveguides 310 so that they are substantially smooth. The isotropic etch may be a dry plasma etch or a wet etch. In an embodiment, the isotropic etch is a wet etch and may be performed by submerging the waveguides 310 in a wet etch solution as illustrated in FIGS. 3f and 3g. This may be done by submerging a cassette 335, as illustrated in FIG. 3f, containing several wafers 340, serving as the substrate 320 on which there are waveguides 310, into a bath 345 containing a wet etch solution 350. In alternate embodiments, the wet etch solution 350 may be sprayed or dispensed onto the waveguides 310. The chemical composition of the wet etch solution depends on the waveguide material 305 from which the waveguides 310 are formed. The wet etch solution 350 may be any solution that will slowly and isotropically etch the waveguides 310 formed of the waveguide material 305, but will not etch the semiconductor substrate 320 or the first dielectric layer 330.

In an embodiment where the waveguides 310 are formed from stoichiometric silicon nitride, the wet etch solution 350 may be an acid having a pH in the approximate range of 0-2 that is compatible with temperatures above approximately 70° C. and is selective to the first dielectric layer 330, meaning that the wet etch solution 350 predominantly etches the stoichiometric silicon nitride. In an embodiment, the wet etch solution 350 used to etch stoichiometric silicon nitride may be between approximately 50% and 90% phosphoric acid ($H_3PO_4$) in water, and in a more specific embodiment, approximately 84% by volume phosphoric acid in water. The temperature of the phosphoric acid wet etch solutions may be in the approximate range of 70° C. and 100° C., and in one particular embodiment the temperature of the phosphoric acid wet etch solution is approximately 85° C. Phosphoric acid has the advantages of not boiling over in the temperature ranges described above, and of having a high selectivity to stoichiometric silicon nitride so that it will not etch the first dielectric layer 330 or the substrate 320.

Sonic energy may be applied to the wet etch solution 350 used to etch stoichiometric silicon nitride by a sonicator 355. The sonic energy may be megasonic or ultrasonic. In an embodiment, the energy of the sonic energy 357, as illustrated in FIG. 3g, is such that it impacts the waveguides 310 with a power in the approximate range of 0.5 W/cm$^2$ to 10.0 W/cm$^2$, and in an alternate embodiment, in the approximate range of 0.5 W/cm$^2$ to 5.0 W/cm$^2$. To achieve a power within this range, megasonic energy in the approximate range of 800 KHz to 1200 KHz, or ultrasonic energy in the approximate range of 1 KHz to 50 KHz may be used. The megasonic energy and the ultrasonic energy may be used individually or in combination. The sonic energy may reduce the viscosity of the wet etch solution 350. This is valuable because the isotropic properties of the wet etch may be lost with increased viscosity of the wet etch solution 350, such as, for example, the viscosity of a phosphoric acid wet etch solution that has a concentration of greater than 90% phosphoric acid. Without the sonic energy, the viscosity of the wet etch solution 350 would likely require reduction by raising the temperature of the wet etch solution 350. This may potentially be detrimental because when the temperature of the wet etch solution 350 is increased, the etch rate will also be increased, thus reducing the control of the etching process and causing variation between the etching of different waveguides 310 on a single substrate. Therefore, with the use of sonic energy, the wet etch may be performed at a lower temperature and thus at a slower etch rate. A slower etch rate, on the order of 1 minute to 60 minutes, is also valuable in that the amount of etching of the waveguides 310 is insignificant during the transfer time of the waveguides 310 from the wet etch bath 345 to the next processing stage.

In one embodiment, the etch rate of the waveguides may be within the approximate range of 20-30 angstroms per minute. In this embodiment the stoichiometric nitride waveguides 310 are etched with a wet etch solution 350 of 84% by volume phosphoric acid in water at a temperature of approximately 85° C. for 30 minutes. During the etch, sonic energy having a power that impacts the waveguides 310 in the approximate range of $0.5 \text{ W/cm}^2$ to $10.0 \text{ W/cm}^2$ is applied to the wet etch solution 350. In one particular embodiment the sonic energy impacting the waveguides 310 has a power of approximately $5.0 \text{ W/cm}^2$. Etching the waveguides 310 with the wet etch solution and the parameters of this particular embodiment have been demonstrated to improve the light loss of the light measured after passing through the waveguides by 40%. The light intensity loss of an untreated anisotropically etched waveguide is approximately 8 dB/cm and the light intensity loss of a substantially smoothed waveguide is approximately 6 dB/cm.

In an alternate embodiment, illustrated in FIG. 3f, where the waveguides 310 are formed from amorphous silicon, the wet etch solution 350 may be a base having a pH in the approximate range of 10-13 and selective to etching amorphous silicon. A base having a pH below 10 may not etch amorphous silicon waveguides at all and a base having a pH above 13 may etch the waveguides too quickly to control the etching. In one embodiment, the base is a non-metallic base. The use of a non-metallic base avoids including metallic impurities in the wet etch solution 350. The non-metallic base may be ammonia hydroxide or an organo-ammonium hydroxide such as tetramethyl ammonium hydroxide or tetraethyl ammonium hydroxide. The organo-ammonium hydroxides tend to be more viscous than ammonia hydroxide. In one particular embodiment, the wet etch solution may be between approximately 2% to 10% ammonium hydroxide by volume in water. The etching may be performed at a temperature in the approximate range of 24° C. to 70° C., and in one particular embodiment the etching may be performed at room temperature (approximately 24° C.) The lower the temperature of the wet etch solution 350, the slower rate at which the waveguides 310 may be etched. Such low temperatures are made possible by the application of sonic energy to the wet etch solution. This is because the sonic energy can reduce the viscosity of the wet etch solution 350, such as those described above, at temperatures in the approximate range of 24° C. to 70° C.

Sonic energy 357, as illustrated in FIG. 3g, may be applied to the wet etch solution 350 used to etch amorphous silicon waveguides 310 by a sonicator 355. The sonic energy 357 may be megasonic or ultrasonic. In an embodiment, the energy of the sonic energy is such that it impacts the waveguides 310 with a power in the approximate range of $0.5 \text{ W/cm}^2$ to $10.0 \text{ W/cm}^2$, and in an alternate embodiment in the approximate range of $0.5 \text{ W/cm}^2$ to $5.0 \text{ W/cm}^2$. To achieve a power within this range, megasonic energy in the approximate range of 800 KHz to 1200 KHz or ultrasonic energy in the approximate range of 1 KHz to 50 KHz may be used. The sonic energy may reduce the viscosity of the wet etch solution 350. This is valuable because the isotropic properties of the wet etch may be lost with increased viscosity of the wet etch solution. For example, the viscosity of wet etch solutions with greater than 50% ammonium hydroxide may inhibit the isotropic properties of the wet etch. Without the sonic energy, the viscosity of the wet etch solution 350 would be reduced by raising the temperature of the wet etch solution. When the temperature of the wet etch solution 350 is increased, the etch rate will also be increased, thus reducing the control of the etching process and causing variation between the etching of different waveguides 310 on a single substrate. Therefore, with the use of sonic energy, the wet etch may be performed at a lower temperature and thus at a slower etch rate. A slower etch rate, on the order of 1 minute to 60 minutes, is also valuable in that the amount of etching of the waveguides 310 is insignificant during the transfer time of the waveguides 310 from the wet etch bath 345 to the next processing stage.

The waveguides 310 are etched for a time sufficient to smooth the surface of the waveguides 310 to maximize retention of a light signal within the waveguides 310. The etch time may be in the approximate range of 1 minute to 60 minutes. The etching time is dependent on the density of the waveguide material 305 from which the waveguides 310 are etched, as well as a number of other parameters including the etchant used in the wet etch solution 350, the concentration of the wet etch solution 350, the temperature of the wet etch solution 350, and the sonic energy applied to the wet etch solution 350.

Figure 3H:
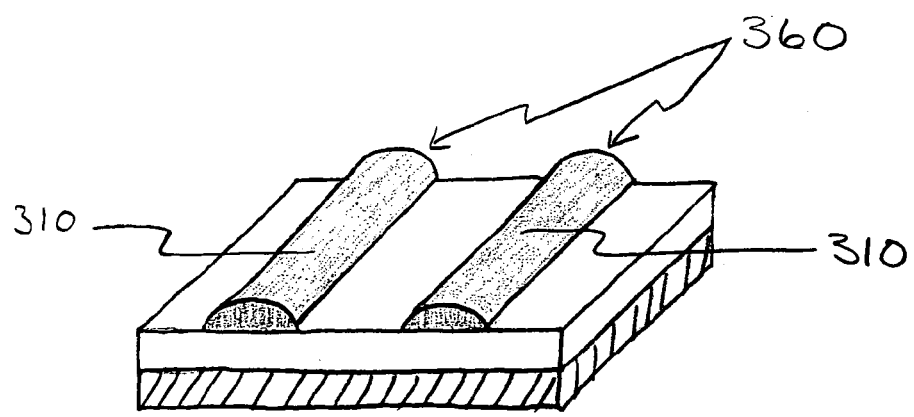
Figure 3I:
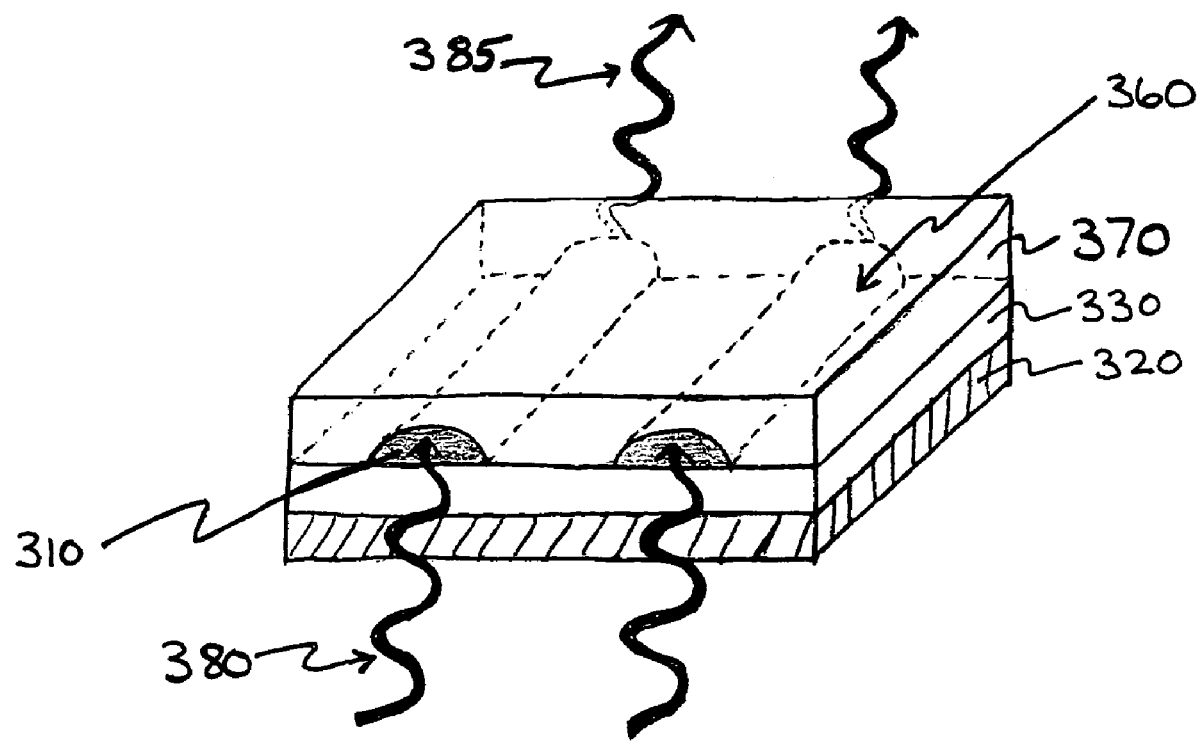

After isotropically etching to substantially smooth a surface of the waveguides 310, the waveguides 310 may have convex rounded surfaces 360 as illustrated in FIG. 3h. FIG. 3h illustrates a convex rounded surface 360, but the surface of the waveguides may retain some of the trapezoidal anisotropic shape from the prior anisotropic etch. The roughness is smoothed to a point where there are no sharp jagged portions on the surface of the waveguides 310. Subtle features may remain, but the light scattering by such defects is negligible when compared to the initial, jagged surface. Over the waveguides 310, a second dielectric layer 370 is formed, as illustrated in FIG. 3i. The first dielectric layer 330 and the second dielectric layer 370 serve as cladding around the waveguides 310. The first dielectric layer 330 and the second dielectric layer 370 may be any type of dielectric material having an index of refraction lower than the material used to form the waveguides 310, such as carbon doped oxide, silicon dioxide, SiOF polymers, and silicon oxynitride. The first dielectric layer 330 and the second dielectric layer 370 may be the same material, or different materials. If the first dielectric 330 and the second dielectric 370 are different materials, they may be materials having the same or similar indices of refraction. Alternatively, if the first dielectric 330 and the second dielectric 370 are different materials they may be materials having different indices of refraction, as long as the indices of refraction of the first dielectric 330 and the second dielectric 370 are lower than the index of refraction of the waveguides 310.

As illustrated in FIG. 3i, the intensity of the light signal 380 entering the substantially smoothed waveguides 310 having a convex rounded surface may be the same, or similar to, the intensity of the light signal 385 exiting the smoothed waveguides 310 having a rounded surface. The convex rounded surfaces of the substantially smoothed waveguides 310 minimize the amount of light scattering within the waveguides 310 so that the amount of light lost during propagation of the light through the waveguides 310 is minimal. The amount of noise in the light signal 385 exiting the waveguides 310 may also be reduced by the reduction of the light scattering within the waveguides 310.

Figure 4A:
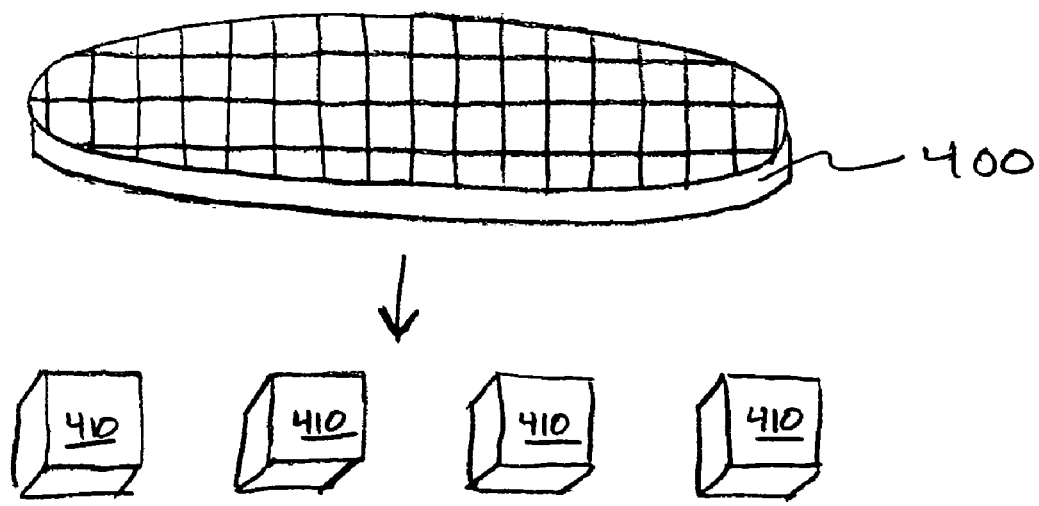
FIGS. 4a and 4b are illustrations of a wafer and a package assembly that contain waveguides.
Figure 4B:
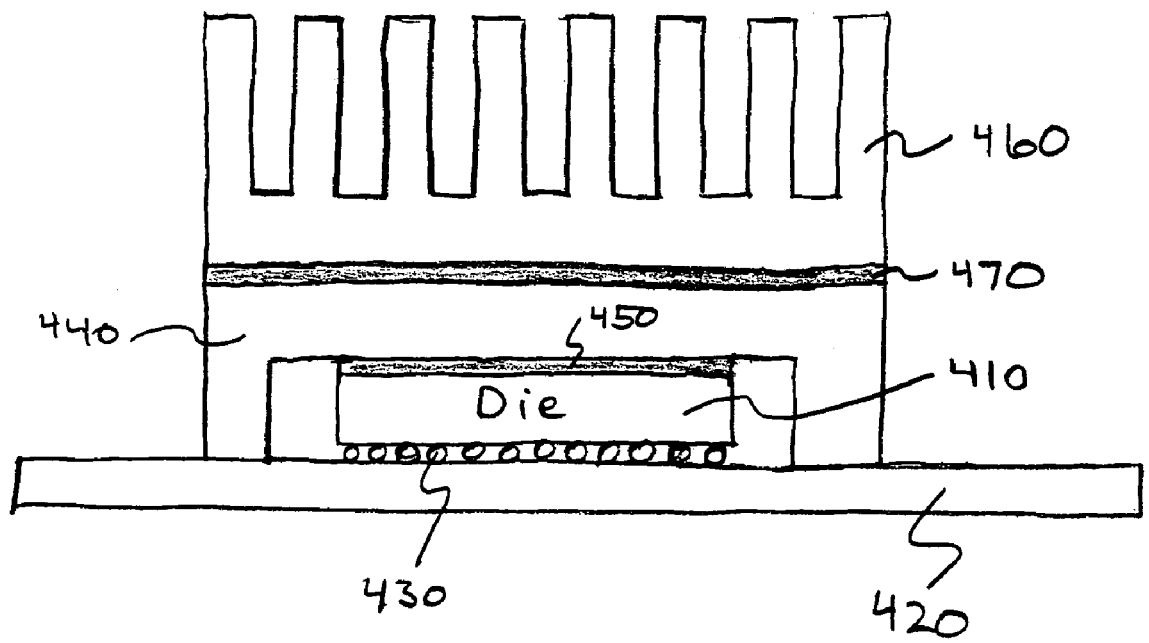

The waveguides may be formed on a silicon wafer 400 as illustrated in FIG. 4a as part of individual integrated circuits on dies 410. The silicon wafer 400 may be cut into the dies 410. The individual dies 410 may then become part of an electronic assembly. The electronic assembly is illustrated in FIG. 4b. The electronic assembly may be a die 410 placed on a package substrate 420 with solder balls 430. Above the die 410 a heat sink 440 may be placed. There may be a thermal interface material 450 in between the die 410 and the heat sink 440. In addition to the heat sink a heat spreader 460 may be placed above the heat sink 440. There may also be a thermal interface material 470 in between the heat sink 440 and the heat spreader 460.

Several embodiments of the invention have thus been described. However, those of ordinary skill in the art will recognize that the invention is not limited to the embodiments described, but can be practiced with modification and alteration within the scope and spirit of the appended claims that follow.

We claim:

1. A method, comprising:
   submerging a waveguide having a trapezoidal anisotropic shape in a wet etch solution to etch the waveguide isotropically to smooth a surface of the waveguide; and
   applying sonic energy to the wet etch solution while etching the waveguide isotropically to form a waveguide having a substantially rounded surface.

2. The method of claim 1, wherein the waveguide comprises stoichiometric silicon nitride.

3. The method of claim 1, wherein the waveguide comprises amorphous silicon.

4. The method of claim 1, further comprising etching the waveguide anisotropically before etching the waveguide isotropically.

5. The method of claim 1, wherein the sonic energy is megasonic.

6. The method of claim 5, wherein the megasonic energy is in the approximate range of 800 KHz -1200 KHz.

7. The method of claim 1, wherein the sonic energy is ultrasonic.

8. The method of claim 7, wherein the ultrasonic energy is in the approximate range of 1 KHz -50 KHz.

9. The method of claim 1, wherein the wet etch solution comprises an acid compatible with temperatures above approximately 70° C. and etches stoichiometric silicon nitride and is selective to dielectric materials.

10. The method claim 9, wherein the wet etch solution comprises approximately 84% by volume phosphoric acid in water.

11. The method of claim 1, wherein the wet etch solution comprises a base having a pH in the approximate range of 10-13 and etches amorphous silicon and is selective to dielectric materials.

12. The method of claim 11, wherein the base is a non-metallic base.

13. The method of claim 1, further comprising performing the isotropic etch at a temperature in the approximate range of 24° C.-70° C.

14. The method of claim 1, further comprising etching the waveguide for a time sufficient to smooth the surface of the waveguide to maximize retention of a light signal within the waveguide.

15. A method, comprising:
    forming an amorphous silicon layer on a first dielectric layer;
    etching the amorphous silicon layer with an anisotropic dry plasma etch to form at least one waveguide having a trapezoidal anisotropic shape;
    submerging the at least one waveguide in an ammonia hydroxide isotropic wet etch solution to which sonic energy is being applied at approximately room temperature for a time sufficient to smooth a surface of the waveguide to form a waveguide having a substantially rounded surface; and
    forming a second dielectric layer above the at least one waveguide.

16. The method of claim 15, wherein the isotropic etch for amorphous silicon is a wet etch solution comprising ammonium hydroxide in the approximate range of 2%-10% by volume in water.

17. The method of claim 15, wherein the sonic energy impacts the waveguide with a power in the approximate range of 0.5 W/cm$^2$-10.0 W/cm$^2$.

18. A method, comprising:
    maximizing retention of an intensity of a light signal within a waveguide by etching a waveguide having a trapezoidal anisotropic shape isotropically to smooth a surface of the waveguide by submerging the waveguide in a wet etch solution and applying sonic energy to the wet etch solution while etching the waveguide isotropically to form a waveguide having a substantially rounded surface.

19. The method of claim 18, wherein the light intensity loss of a substantially smoothed waveguide is approximately 6 dB/cm.

20. The method of claim 18, wherein the waveguide is amorphous silicon.

* * * * *